United States Patent [19]

Dionne

[11] Patent Number: 4,883,179
[45] Date of Patent: Nov. 28, 1989

[54] ANGLED PACKING MATERIAL

[75] Inventor: Pierre A. Dionne, Martinsville, Va.

[73] Assignees: Pierre Dionne; Southeast Foam Converting & Packaging, Inc., both of Stokesdale, N.C. ; a part interest

[21] Appl. No.: 141,147

[22] Filed: Jan. 6, 1988

[51] Int. Cl.$^4$ .............................................. B65D 81/02
[52] U.S. Cl. ...................................... 206/523; 206/586; 206/453; 229/DIG. 1
[58] Field of Search ............... 206/523, 586, 453, 587, 206/813; 229/DIG. 1

[56] References Cited

U.S. PATENT DOCUMENTS

| | | | |
|---|---|---|---|
| 3,200,547 | 8/1965 | Johson | 229/DIG. 1 |
| 3,283,988 | 11/1966 | Hardigg | 206/586 |
| 3,314,584 | 4/1967 | Knapp et al. | 206/586 |
| 3,580,469 | 5/1971 | Reese | 206/586 |
| 3,684,636 | 8/1972 | Rothrock, Jr. et al. | 206/586 |
| 3,973,720 | 8/1976 | Schmid | 229/DIG. 1 |
| 3,994,433 | 11/1976 | Jenkins et al. | 206/523 |
| 3,995,677 | 5/1976 | Collingwood | 206/453 |
| 4,413,735 | 11/1983 | Little | 206/523 |

Primary Examiner—David T. Fidei
Attorney, Agent, or Firm—Charles E. Brown; Charles A. Brown

[57] ABSTRACT

Packing members which are formed from expanded plastic foam sheet, such as polystrene, wherein the sheet is resilient. The sheet is provided with a backing which may be formed of bendable paper. A typical packing member will be formed by dividing the sheet into two legs by a longitudinal groove which is V-shaped in cross section and which does not extend into the backing. The surfaces of the foam sheet defining the V-groove are coated with an adhesive which will bond the legs together in annular relation at a later date so that the packing member may be shipped in its flat state. Because of the compression of the sheet material, it may be readily bent to form corners as opposed to cracking with the result that a leg of the packing member may be provided with a V-notch to divide that leg into two portions. The V-notch will be closed when the other leg is bent at right angles.

18 Claims, 7 Drawing Sheets

ANGLED PACKING MATERIAL

This invention relates in general to new and useful improvements in angled packing material, and more particularly to an angled packing material which is formed of a flexible cushioning material having abendable backing.

In accordance with this invention, the cushioning material has a backing applied thereto. Then a V-groove is formed in the cushioning material extending entirely through the cushioning material but not into the backing. This divides the material into generally two legs which have a hinged connection therebetween Thereafter, a suitable adhesive may be applied to the surfaces of the cushioning material defining the V-groove so that when the grooved material has the two legs thereof folded at right angles to one another, the surfaces defining the V-groove will bond together and maintain the angular relationship of the two legs.

Variations of the packing material will include notching one or more of the legs so as to provide corner pads of various configurations. At this time it is pointed out that by using a cushioning material which is resilient, the material may be bent at right angles without the usual cracking thus greatly facilitating the formation of a corner pad.

It has also been found that the cushioning sheet material may be readily provided with a V-groove by way of a grinding operation utilizing a contoured grinding wheel.

With the above and other objects in view that will hereinafter appear, the nature of the invention will be more clearly understood by reference to the following detailed description, the appended claims, and the several views illustrated in the accompanying drawings.

Figure 1:
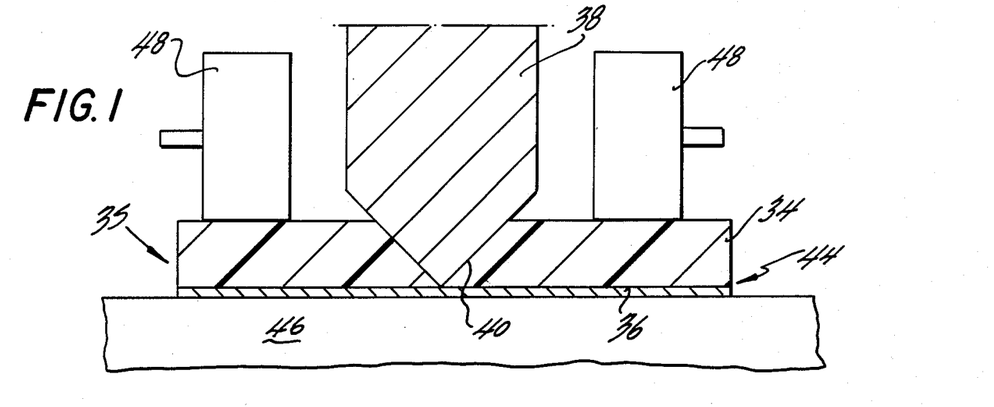
FIG. 1 is a schematic vertical sectional view showing the manner in which a compressed strip of expanded plastic foam having a backing thereon may have a V-groove formed therein utilizing a contoured grinding wheel.

Referring now to the drawings in detail, reference is first made to FIG. 1 it will be understood that in order to form a packing member, a strip of expanded plastic foam material, such as the strip 34, is bonded to a suitable backing 36 which is preferably in the form of a readily foldable paper.

Customarily expanded plastic foam material is cut utilizing a hot wire. However, it is not feasible to so do when there is a burnable backing, such as the backing 36. Attempts have been made to cut the expanded plastic foam material utilizing saws, but the saw blades have a tendency to drag on the material resulting in rough surfaces In accordance with this invention, it has been found that a V-groove may be formed in the strip 34 most expeditiously utilizing a grinding wheel 38 having a contoured, V-cross section peripheral surface 40.

Figures 2, 3, 4, 5:
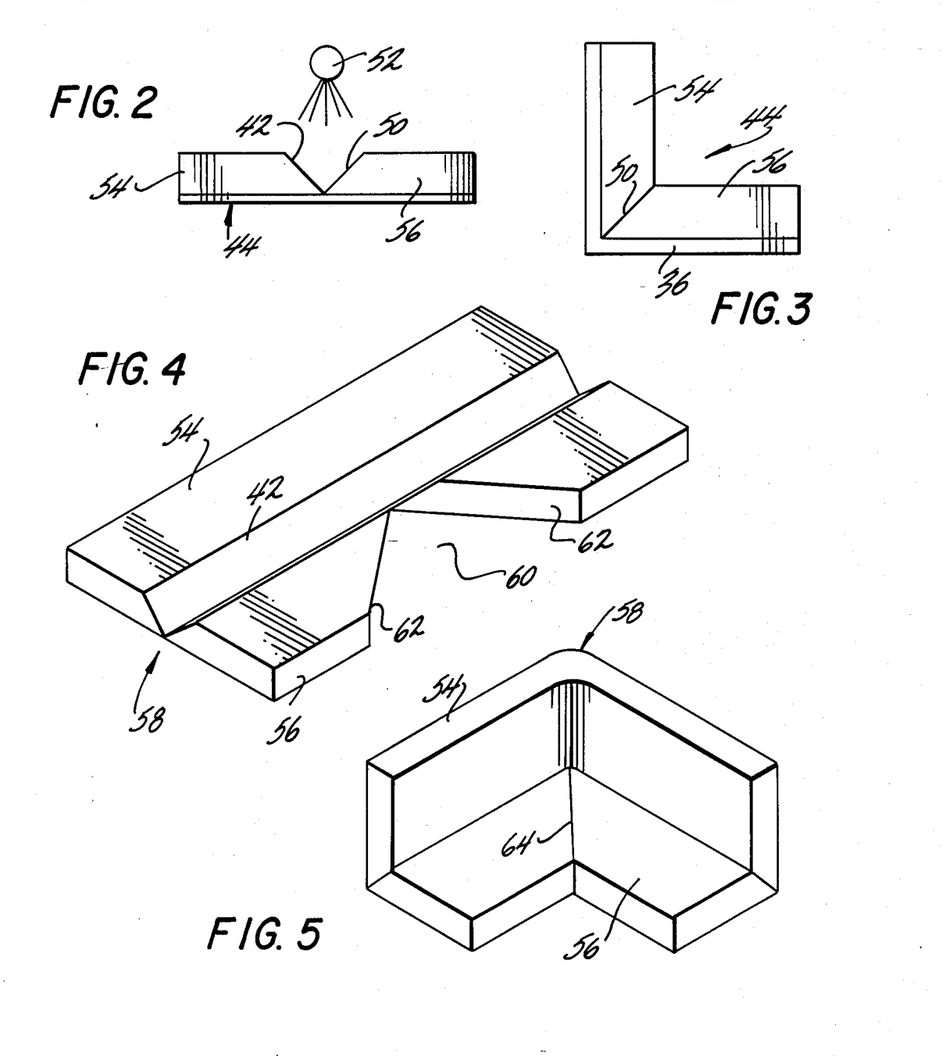
FIG. 2 is a schematic end view of a grooved strip as shown in FIG. 1 with an adhesive being applied to the surfaces defining the V-groove.
FIG. 3 is an end view showing an angled packing member wherein the two legs of the grooved strip are disposed at right angles to one another and the surfaces previously defining the V-groove are disposed in abutting bonded together relation
FIG. 4 is a perspective view of a modified form of packing member for forming a corner pad.
FIG. 5 is a perspective view showing a corner pad formed from the packing material of FIG. 4.

In the grinding of the V-groove, which V-groove is best shown in FIG. 2 and identified by the reference numeral 42, the packing material, identified by the numeral 44, which is formed of the expanded plastic foam material 34 and the backing 36, is mounted on a suitable support 46 and is generally held against that support by means of rollers 48 positioned on opposite sides of the grinding wheel 38. By providing relative longitudinal movement between the grinding wheel 38 and the packing material 44, the desired V-groove 42 may be formed without damaging the backing 36.

Thereafter, the surfaces of the packing material 44 defining the V-groove 42 are coated with a suitable adhesive 50. The adhesive 50 is preferably a water solvent rubber latex which may be applied to the surfaces of the V-groove 42 by brush, roller coating or spray with the spray method being illustrated utilizing a spray head 52.

It is to be understood that the rubber latex adhesive 50 will maintain a high tack quality over relatively long periods of time so that the packing material 44 may be shipped and retained flat for a period of time while the surfaces of the V-groove 42 are exposed to the air.

When the packing material 44 is to be utilized, the two legs 54, 56 thereof defined by the V-groove 42, are positioned at right angles to each other with the surfaces of the V-groove 42 being placed in opposed contacting relation so that the adhesive coating 50 may serve to bond together the two legs, as is shown in FIG. 3.

Reference is now made to FIG. 4 wherein there is illustrated a modified form of packing member generally identified by the numeral 58. The packing member 58 starts with the packing member 44 and includes two legs 54, 56 which are separated by the V-groove 42. The packing member 58 differs from the packing member 44 in that the leg 56 is provided with a V-notch 60 which extends to the bottom of the V-groove 42. The V-notch 60 includes surfaces 62 which are suitably coated with the adhesive 50.

The packing member 58 first has the legs 54, 56 thereof folded as with respect to the packing member 44, after which the leg 54 is bent at right angles in alignment with the V-notch 60 to bring the adhesive coated surfaces 62 together to form a joint 64 between the two portions of the leg 56. The net result is that the packing member 58 becomes a corner pad. While the two portions of the leg 56 have been illustrated as being of like length, it is to be understood that the V-notch 60 need not be centered. Further, it is to be noted that the backing 36 has not been illustrated for convenient purposes.

Figure 6:
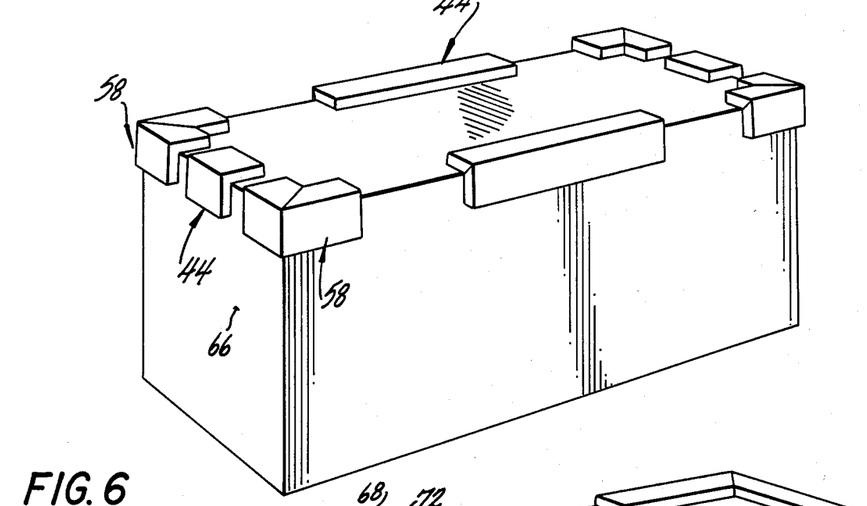
FIG. 6 is a fragmentary top perspective view of a box-like member wherein the top thereof is protected by an arrangement of angle and corner packing members formed in accordance with FIGS. 3 and 5.

Referring now to FIG. 6, it will be seen that there is illustrated an upper one end of a box shaped-like member 66 which has engaged therewith two of the packing members 44 of different lengths, and two of the corner pads 58. The member 66, when so protected, may be mounted within a shipping box in protective relation.

Figures 7, 8:
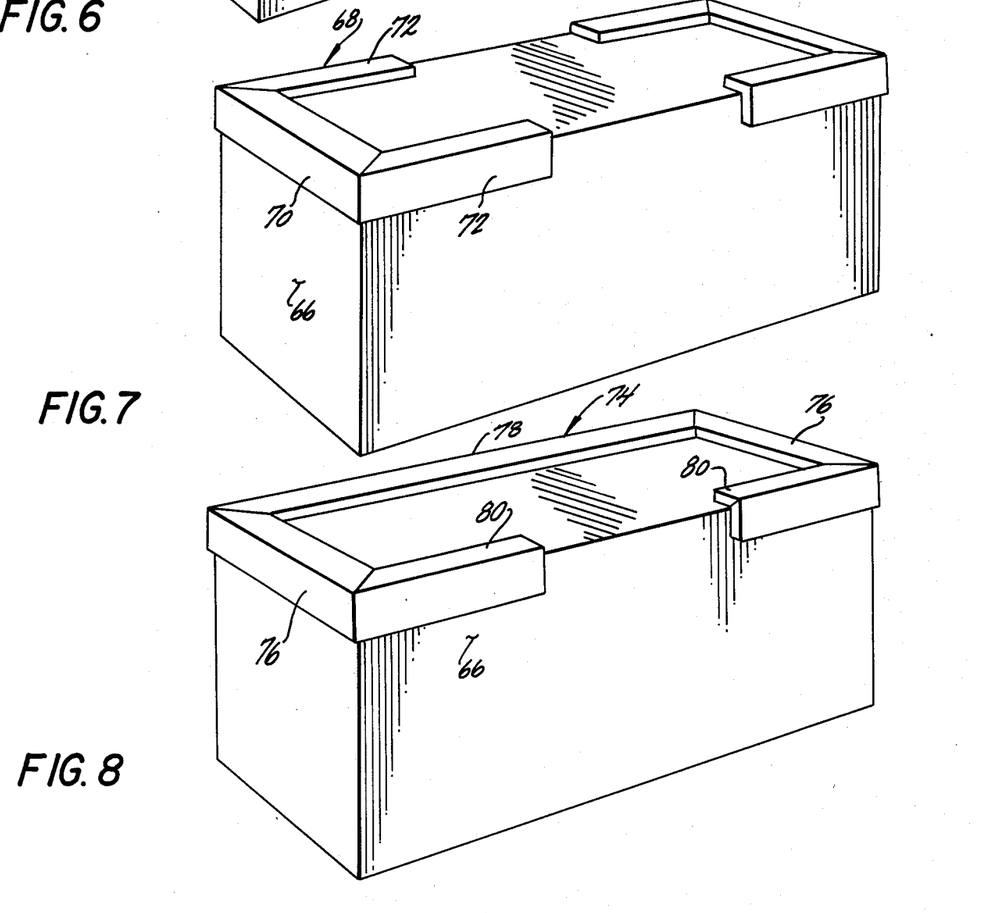
FIG. 7 is a fragmentary top perspective view of a box-like member having the top thereof at one end thereof protected by another form of packing member.
FIG. 8 is a top perspective view of a box-like member which has the entire top thereof protected by a single packing member.

Reference is now made to FIG. 7 wherein the box-like member 66 has an upper end thereof protected by yet another form of packing member generally identified by the numeral 68. The packing member 68 is formed basically from an elongated packing member 44 which is provided with two sets of the V-notches 60 to include a center leg 70 and two free legs 72 with the center leg 70 being of a length corresponding to the width of the end of the member 66.

Reference is now made to FIG. 8 wherein there is illustrated the entire top of the box-like member which is to be protected. The top of the box-like member 66 is protected by a single packing member 74 which is formed from an elongated version of the packing member 44 but wherein four V-notches are formed in one of the legs thereof. These four V-notches will be spaced apart so as to provide two end legs 76 joined by a longitudinal leg 78, the legs 76, 78 being of a length corresponding to the width and length of the member 66. There will also be two terminal legs 80.

Figure 9:
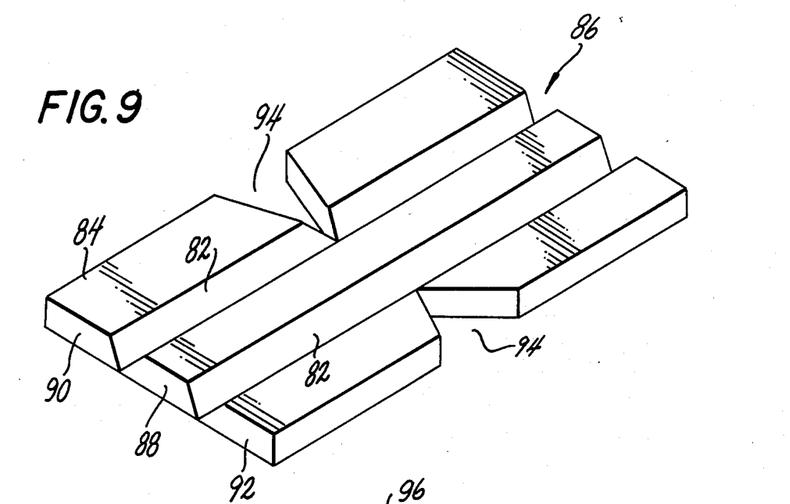
FIG. 9 is a perspective view of another form of packing member in its flat state particularly adapted to form a channel packing member.

Reference is now made to FIG. 9 wherein it will be seen that a strip of expanded plastic foam material having the customary backing thereon is provided with two longitudinally extending, parallel V-grooves identified by the numeral 82 and corresponding to the V-groove 42. It is to be understood that the strip, which is identified by the numeral 84, has a backing corresponding to the backing 36 and that the surfaces defining the V-grooves 82 are coated with an adhesive in the same manner as are the surfaces of the V-groove 42. As described, there is formed a packing member 86 which includes a central leg 88 and outer legs 90, 92. The legs 90, 92 may be folded at right angles to the leg 88 and the surfaces defining the V-grooves 82 bonded together so as to form a channel cross section packing member. The width of the leg 88 will be in accordance with the thickness of a projecting ledge or board-like member which is to be protected. The resultant channel-shaped packing member would have a cross section shown at the end of the packing member shown in FIG. 10.

The packing member 86 may be modified to have a V-notch 94 in each of the legs 90, 92. The V-notches will correspond to the V-notch 60 and the surfaces of the legs defining the V-notches 94 will have a suitable adhesive coating thereon as previously described.

Figure 10:
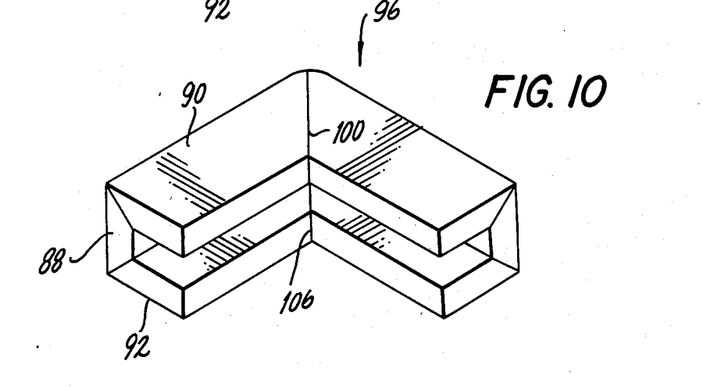
FIG. 10 is a top perspective view of a channel corner pad formed from the packing member of FIG. 9.
Figure 11:
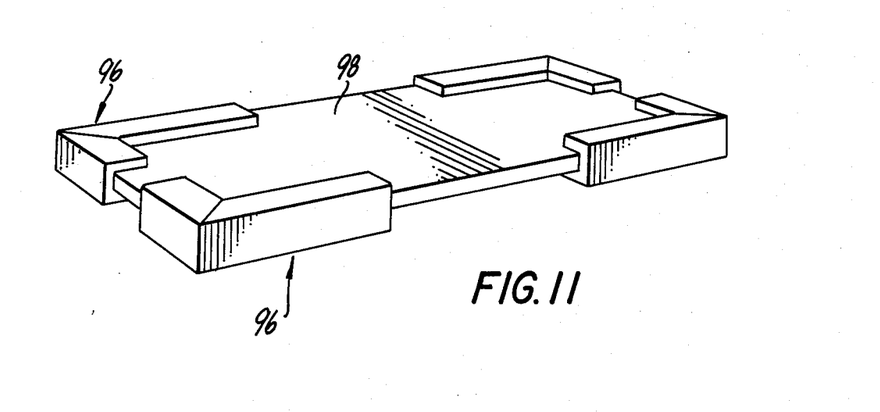
FIG. 11 is a fragmentary top perspective view showing a plate-like member being protected at one end thereof by a pair of corner channel pads of FIG. 10.

The modified packing member 86 will form a corner channel pad, which is identified by the numeral 96 and which is best illustrated in FIG. 10. The corner channel pad 96 is usable to protect corners and edge portions of a board or plate-like member 98 as is best illustrated in FIG. 11. It is to be noted that the portions of the legs 90, 92 will be joined together as at 100, as is shown in FIG. 10 with the portion of the leg 88 aligned therewith being bent as described with respect to the packing member 58 and shown in FIG. 5.

Figure 12:
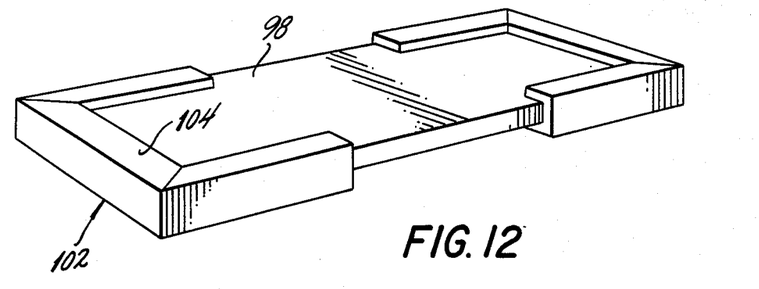
FIG. 12 is a fragmentary top perspective view similar to FIG. 11 and shows a corner channel pad which extends around two corners of the plate-like member.

Reference is now made to FIG. 12 wherein it will be seen that a single packing member 102 will protect one end of the plate or board-like member 98. In this instance, the basic packing member 86 is made very long and each of the legs 90, 92 thereof will be provided with two sets of V-notches 94. The net result is a generally U-shaped in plan packing member 102 with a central leg 104 which is of a length corresponding to the width of the member 98 to be protected.

Figure 13:
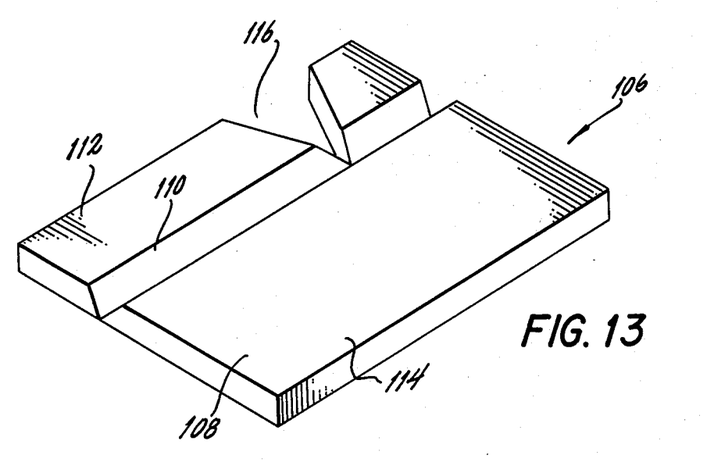
FIG. 13 is a top perspective view of yet another form of packing member.

Reference is now made to FIG. 13 where still another form of packing member, generally identified by the numeral 106 is illustrated. The packing member 106 is formed from a sheet of expanded plastic foam material 108 to which a backing (not shown) has been applied. A longitudinal V-groove 110 is formed in the sheet 108 so as to separate the sheet 108 into a narrow leg 112 and a wide leg 114. Further, the narrow leg 112 has adjacent, but spaced from one end thereof a V-notch 116. The surfaces of the sheet 108 defining the V-groove 110 and the V-notch 116 are coated with an adhesive in the manner shown in FIG. 2.

Figure 14:
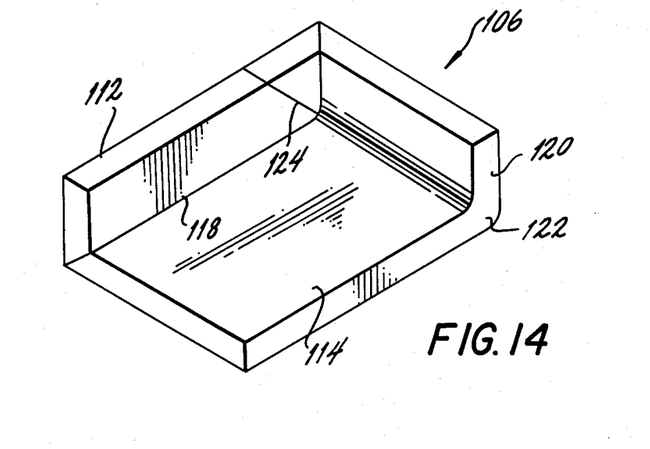
FIG. 14 is a top perspective view of a quarter section perimeter tray formed from the packing member of FIG. 13.

The packing member 106, when folded and bent, will form a quarter section perimeter tray as is best shown in FIG. 14. The legs 112, 114 are first folded at right angles to each other and bonded together to form a corner joint 118. Then an end portion 120 of the leg 114 is bent as at 122 at right angles to the remainder of the leg 114 until the V-notch 116 is closed to form a bonded joint 124 between the two portions of the leg 112.

Figure 15:
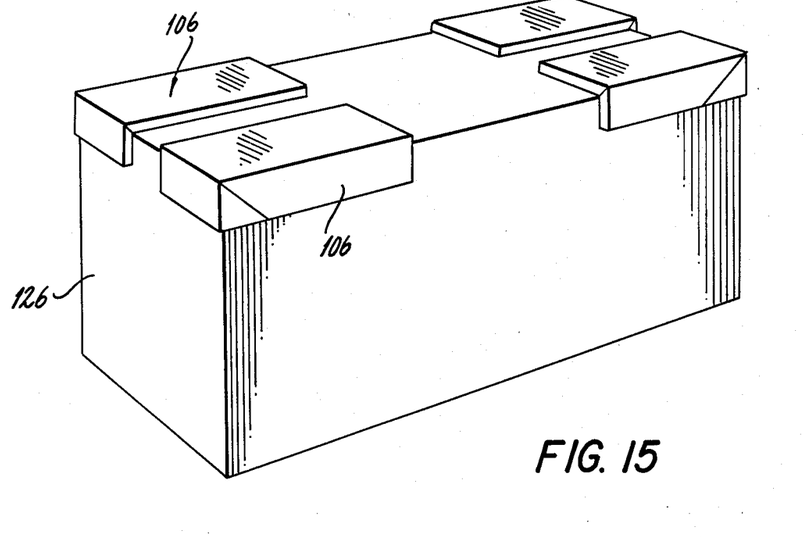
FIG. 15 is a fragmentary top perspective view of a box-like member having two corners thereof protected by the tray of FIG. 14.

With reference to FIG. 15, it will be seen that the quarter section perimeter tray formed from the packing member 106 will protect corner portions of a box-like member 126.

Figure 16:
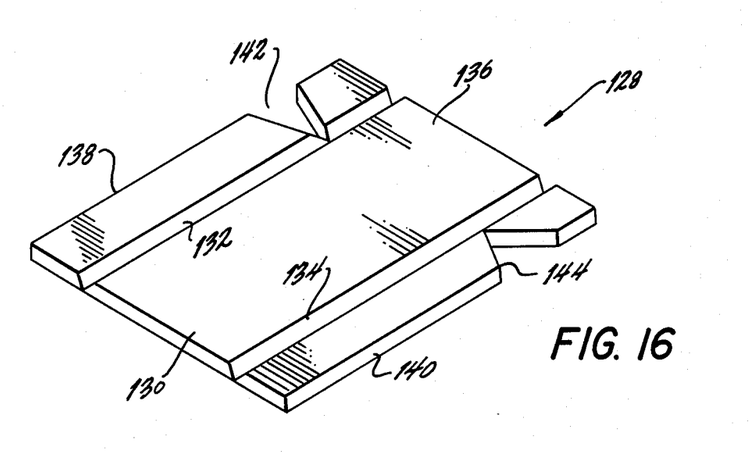
FIG. 16 is a top perspective view of yet another form of packing member.

Reference is now made to FIG. 16 wherein another form of packing member, generally identified by the numeral 128 is illustrated. The packing member 128 is similar to the packing member 106, but may begin with a wider sheet portion 130 of expanded plastic foam material than the sheet 108. The sheet 130 is provided with two longitudinal V-30 grooves 132, 134 to divide the sheet 130 into a relatively wide central leg 136 and two outer legs 138, 140. Adjacent one end of the leg 138 there is a V-notch 142. A similar V-notch 144 is formed in the leg 140 in transverse 35 alignment with the V-notch 142.

It is to be understood that the surfaces of the sheet 130 defining the V-grooves 132, 134 and the V-notches 142, 144 will be coated with a suitable adhesive as previously described.

Figure 17:
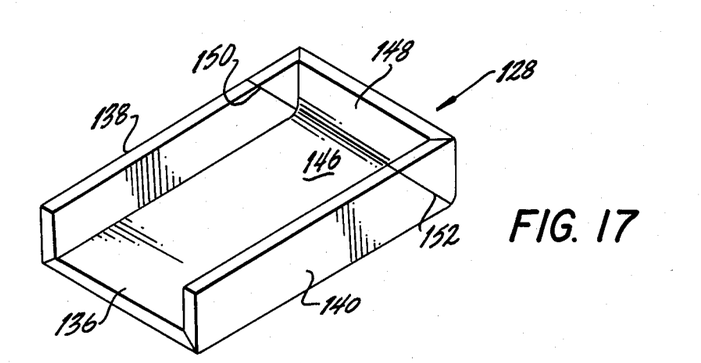
FIG. 17 is a top perspective view of a half section perimeter tray formed from the packing member of FIG. 16.

The packing member 128, in its erected state, forms a half section perimeter tray as is best shown in FIG. 17. The tray is formed by first folding the legs 138, 140 at right angles to the leg 136. Then the leg 136 is bent as at 146 in transverse alignment with the V-notches 142, 144 at right angles to the remainder of the leg 136 to define an upstanding portion 148. This results in the closing of the V-notches 142, 144 to form bonds 150, 152 between the portions of the legs 138, 140. Once again the bending of the sheet material is possible due to the resiliency of the sheet material.

Figure 18:
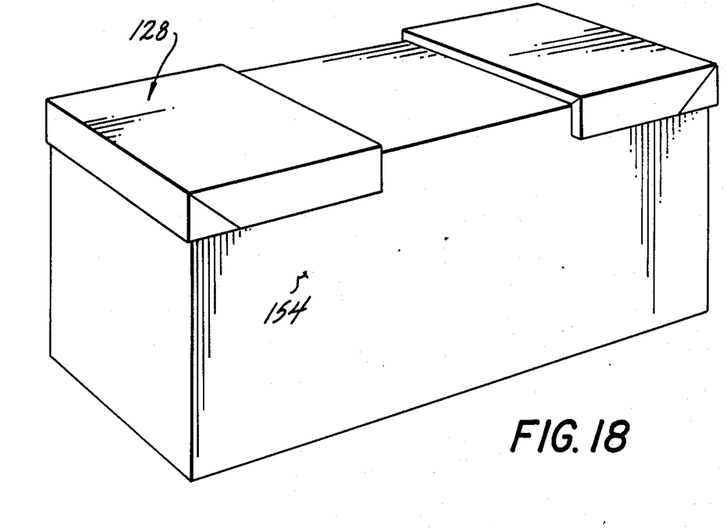
FIG. 18 is a fragmentary top perspective view of a box-like member which is protected at one end at the top thereof by the tray of FIG. 17.

The packing member 128 in the form of the half section perimeter tray is utilized to protect one end of a box-like member 154 as is best shown in FIG. 18.

Figure 19:
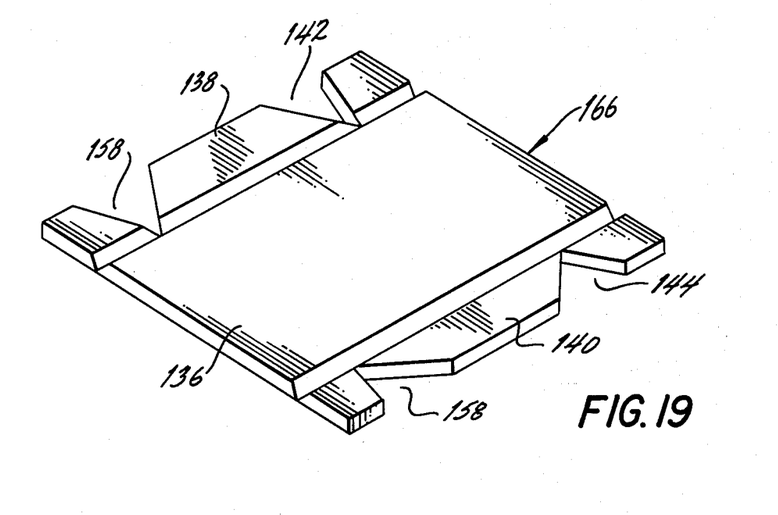
FIG. 19 is a top perspective view of yet another form of packing member.
Figure 20:
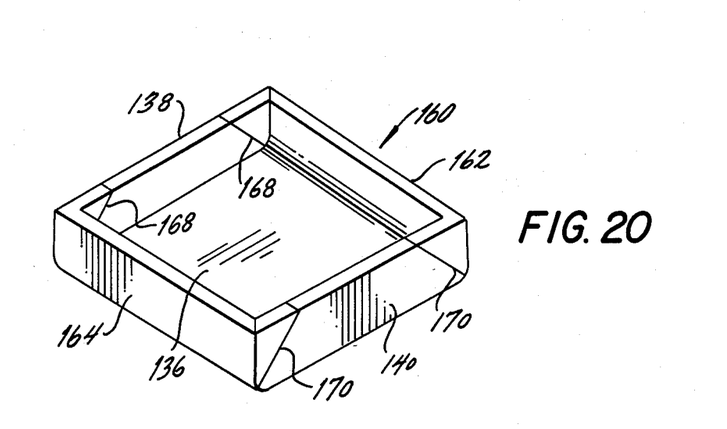
FIG. 20 is a top perspective view of a full section perimeter tray formed from the packing member of FIG. 19.

Referring now to FIGS. 19 and 20, it will be seen that the basic structure of the packing member 128 may be modified to provide the leg 138 adjacent the opposite end thereof with a second V-notch 156. A similar second V-notch 158 is formed in transverse alignment with the V-notch 156 in the leg 140. The net result is a packing member generally identified by the numeral 160 which in its erected form, as shown in FIG. 20, is a full section perimeter tray.

The tray 160 is formed in the same general manner as is the tray 128 by first folding the legs 138, 140 at right angles to the center leg 136. Then opposite end portions of the leg 136 are folded in transverse alignment with the V-notches 142, 144 on the one hand and the V-notches 156, 158 on the other hand so as to provide end portions of the leg 136 as upstanding end portions 162, 164. The three portions of the leg 138 are then joined together by bonds 166, 168 while the three portions of the leg 140 are joined together by bonds 170.

Figure 21:
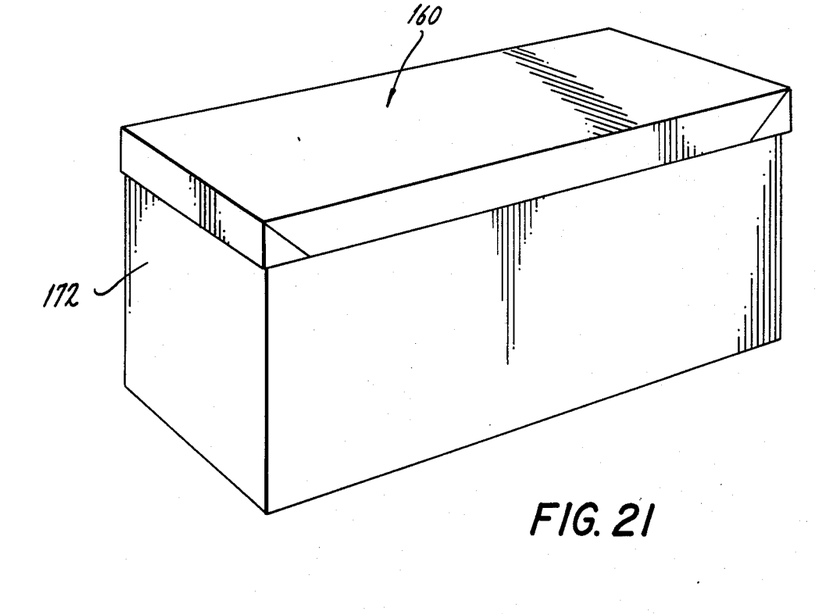
FIG. 21 is a fragmentary top perspective view of a box-like member which has the top thereof protected by the tray of FIG. 20.

The full section perimeter tray 160 will be of a width and length so as to protect the top (also bottom) of a box-like member 172 as is shown in FIG. 21.

Although a number of preferred embodiments of packing members formed in accordance with this invention have been specifically illustrated and described herein, it is to be understood that minor variations may be made in the packing members without departing from the spirit and scope of the invention as defined by the appended claims.

I claim:

1. A packing member in the form of an edge or corner protector, said packing member comprising a plastic foam sheet having a sheet material backing, and said plastic foam sheet having a longitudinal V-groove dividing said plastic foam sheet into two legs connected to one another by a hinge defined by said sheet material backing, said V-groove in combination with said hinge defining means for facilitating folding of said two legs from a planar state to one wherein said two legs are generally at a right angle to one another with the foam of one leg abutting the foam of the other leg, surfaces of said V-groove having an adhesive coating which is a water soluble rubber latex thereon for forming a bond when said legs are folded to bring said surfaces of said V-groove into facing contact.

2. A packing member according to claim 1 wherein there is a second transverse V-groove in said plastic foam sheet parallel to the first mentioned V-groove and further dividing said plastic foam sheet to have three legs, and said three legs being foldable from a planar state to a channel shape.

3. A packing member according to claim 1 wherein one of said legs has a V-notch therein and the other of said legs is in bendable alignment with said V-notch to define an angled corner member.

4. A packing member according to claim 1 wherein one of said legs has a V-notch therein and the other of said legs is in bent alignment with said V-notch defining an angled corner member.

5. A packing member according to claim 3 wherein said one leg has a second V-notch therein and said other leg is also bendable in alignment with said second V-notch to define a double angled corner member 6. A packing member according to claim 4 wherein said one leg has a second V-notch therein and said other leg is also bent in alignment with said second V-notch to defining a double angled corner member.

7. A packing member according to claim 1 wherein said one leg has four V-notches therein in spaced relation and the other of said legs is bendable in alignment with each of said V-notches to define a rectangular angled surrounding member.

8. A packing member according to claim 1 wherein said one leg has four V-notches therein in spaced relation and the other of said legs is bent in alignment with each of said V-notches defining a rectangular angled surrounding member.

9. A packing member according to claim 1 wherein said three legs include a center leg and two outer legs, said outer legs having V-notches in transverse alignment with each other, and said center leg is bendable in transverse alignment with said V-notches to define a channel shaped corner member.

10. A packing member according to claim 1 wherein said three legs include a center leg and two outer legs, said outer legs having V-notches in transverse alignment with each other, and said center leg is bent in transverse alignment with said V-notches to define a channel shaped corner member.

11. A packing member according to claim 9 wherein there are at least two sets of said V-notches and said center leg is bendable in transverse alignment with each set of said V-notches.

12. A packing member according to claim 6 wherein there are at least two sets of said V-notches and said center leg is bent in transverse alignment with each set of said V-notches.

13. A packing member according to claim 1 wherein one of said legs is wide as compared to the other of said legs, said other leg has a transverse notch adjacent one end of plastic foam sheet, and said one leg is bendable in transverse alignment with said V-notch to form a quarter section perimeter tray.

14. A packing member according to claim 1 wherein said three legs include a center leg and two outer legs, said outer legs having V-notches in transverse alignment with each other and adjacent one end of said plastic foam sheet, and said center leg is wide as compared to said outer legs and is transversely bendable in transverse alignment with said V-notches to form a half section perimeter tray.

15. A packing member according to claim 1 wherein said three legs include a center leg and two outer legs, said outer legs having V-notches in transverse alignment with each other and adjacent one end of said plastic foam sheet, and said center leg is wide as compared to said outer legs and is transversely bent in transverse alignment with said V-notches to form a half section perimeter tray.

16. A packing member according to claim 1 wherein said three legs include a center leg and two outer legs, said outer legs having V-notches in transverse alignment with each other and adjacent each end of said plastic foam sheet to provide two sets of said V-notches, said center leg is wide as compared to said outer legs, and said center leg is bendable in transverse alignment with each set of V-notches to form a full section perimeter tray.

17. A packing member according to claim 1 wherein said three legs include a center leg and two outer legs, said outer legs having V-notches in transverse alignment with each other and adjacent each end of said plastic foam sheet to provide two sets of said V-notches, said center leg is wide as compared to said outer legs, and said center leg is bent in transverse alignment with each set of V-notches to form a full section perimeter tray.

18. A packing member according to claim 1 wherein said plastic foam sheet at said V-groove has the appearance of having been ground to form said V-groove.

* * * * *